(12) United States Patent
Uchida

(10) Patent No.: US 9,036,190 B2
(45) Date of Patent: May 19, 2015

(54) INFORMATION PROCESSING APPARATUS AND METHOD OF INSTALLING A PRINTER DRIVER

(71) Applicant: CANON KABUSHIKI KAISHA, Tokyo (JP)

(72) Inventor: Tatsuro Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/017,664

(22) Filed: Sep. 4, 2013

(65) Prior Publication Data

US 2014/0071474 A1    Mar. 13, 2014

(30) Foreign Application Priority Data

Sep. 11, 2012 (JP) ................. 2012-199920

(51) Int. Cl.
*G06F 15/00* (2006.01)
*G06F 3/12* (2006.01)

(52) U.S. Cl.
CPC ............ *G06F 3/1228* (2013.01); *G06F 3/1298* (2013.01); *G06F 3/1225* (2013.01); *G06F 3/1232* (2013.01); *G06F 3/1204* (2013.01); *G06F 3/1285* (2013.01)

(58) Field of Classification Search
CPC ............................. G06F 3/1204; G06F 3/1285
USPC ................................................. 358/1.13–1.15
See application file for complete search history.

(56) References Cited

U.S. PATENT DOCUMENTS 7,619,758 B2    11/2009    Kujirai et al.
2011/0075177 A1*    3/2011    Takagi .................... 358/1.13

FOREIGN PATENT DOCUMENTS

JP    2011-013816 A    1/2011

* cited by examiner

*Primary Examiner* — Saeid Ebrahimi Dehkord
(74) *Attorney, Agent, or Firm* — Fitzpatrick, Cella, Harper & Scinto

(57) ABSTRACT

If a printer driver corresponding to identification information (MDL) transmitted from a printer cannot be found, an information processing apparatus generates class driver identification information (CID) based on the identification information (MDL) and installs a class driver using the generated class driver identification information (CID).

6 Claims, 12 Drawing Sheets

FIG. 7A

DEVICE ID

| MANUFACTURER (MFG) |
| COMMAND (CMD) |
| MODEL (MDL) |
| COMPATIBLE ID (CID) |

FIG. 7B

EXAMPLE OF DEVICE ID
MANUFACTURER:ABC;COMMAND SET:PCL;MODEL:M123;COMPATIBLEID:Class1;

FIG. 8A

[Manufacture]
"ABC"=ABC

[MDL to CID]
M123=Class1
M135=Class1
M147=Class1
M159=Class1
M234=Class2
M246=Class2
M258=Class2
M345=Class3
...

[Manufacture]
"ABC"=ABC

[CMD to CID]
PCL=Class1
PCL6=Class2
PS=Class3
...

~252

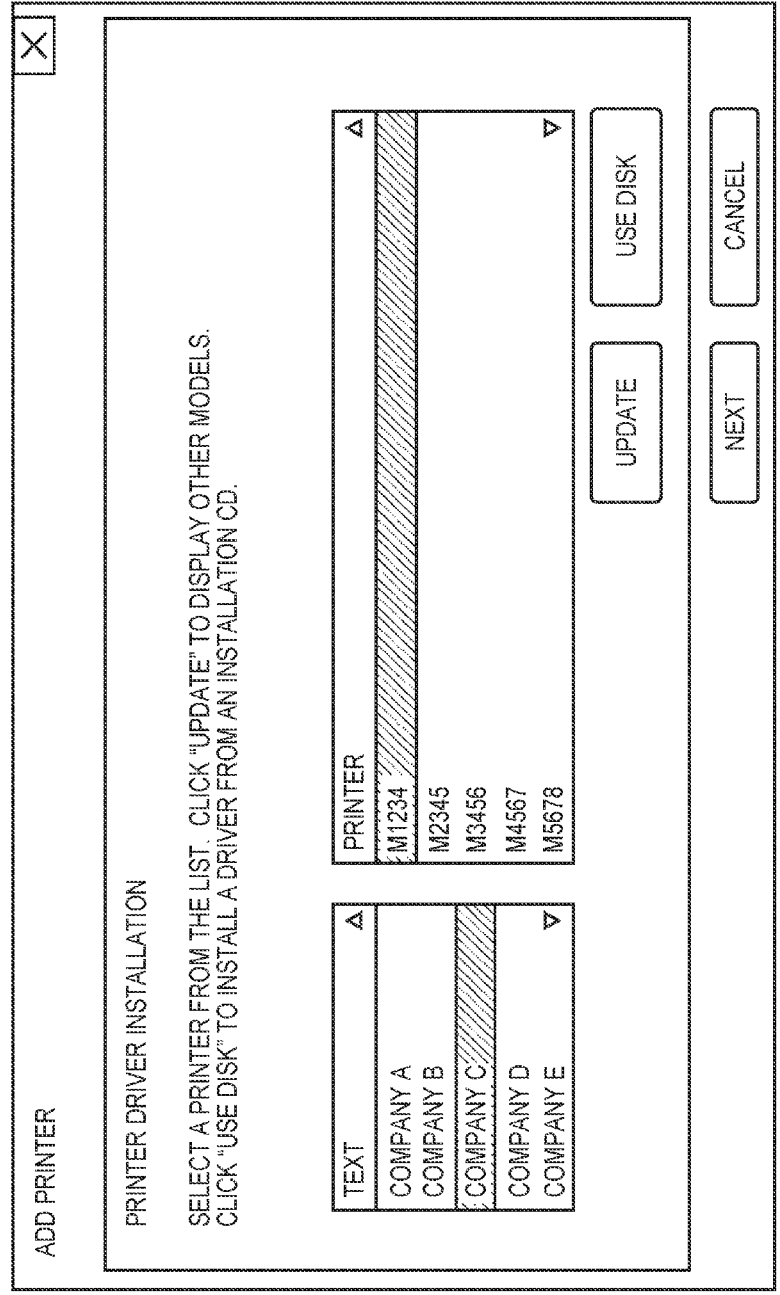

INFORMATION PROCESSING APPARATUS AND METHOD OF INSTALLING A PRINTER DRIVER

BACKGROUND OF THE INVENTION

1. Field of the Invention

The present invention relates to a driver installation system for installing an appropriate driver in order to use a printer or the like that is connected to a computer, for example.

2. Description of the Related Art

Plug and play is well-known as a technique for installing a driver, which is software for using a connected device, on a computer when a peripheral device such as a printer is connected to the computer.

The technique disclosed in Japanese Patent Laid-Open No. 2011-013816 is an example of a prior technology that uses a plug and play system. Japanese Patent Laid-Open No. 2011-013816 discloses that a printer acquires a device ID for a common driver from another printer, and responds to a plug and play device ID request with a device ID for a common driver.

However, in Japanese Patent Laid-Open No. 2011-013816, if the other printer does not have a device ID, it cannot send the device ID to an information processing apparatus in response to the device ID request. In other words, if the printer does not have the device ID needed in realizing plug and play processing, the appropriate printer driver cannot be installed using plug and play processing.

SUMMARY OF THE INVENTION

The present invention has the following configuration.

According to one aspect of the present invention, there is provided an information processing apparatus comprising: a generator configured to, in a case where a printer driver corresponding to first identification information of a printer is not found, and second identification information for a common driver is not transmitted from the printer, generate the second identification information based on the first identification information; and an installer configured to install a printer driver that corresponds to the generated second identification information, wherein the printer driver installed by the installer is used in common by a plurality of models of printers.

According to the present invention, user convenience in a plug and play system can be improved.

Further features of the present invention will become apparent from the following description of exemplary embodiments with reference to the attached drawings.

BRIEF DESCRIPTION OF THE DRAWINGS

FIGS. 7A and 7B are diagrams showing a configuration and an example of a device ID 340.

FIGS. 8A and 8B are diagrams showing examples of CID conversion information.

FIG. 12 shows an example of a printer adding screen.

DESCRIPTION OF THE EMBODIMENTS

Preferred embodiments for implementing the present invention will be described below with reference to the drawings.

Embodiment 1

System Configuration

Figure 1:
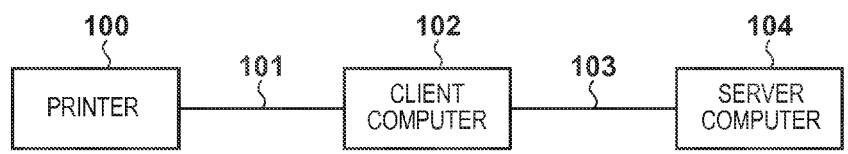
FIG. 1 is a block diagram showing a system configuration of the present invention.

FIG. 1 is a block diagram showing an example of a system configuration of the present invention. A driver installation system of the present embodiment is configured by a printer 100, a client computer 102, and a server computer 104. The printer 100 and the client computer 102 are connected via a connection medium 101 that enables bidirectional communication, and the client computer 102 and the server computer 104 are connected via a connection medium 103 that enables communication, such as the Internet or an intranet. Note that there may be multiple server computers 104. Note that the printer 100 is also referred to as a peripheral device, and examples thereof include a multifunction printer (MFP), an inkjet printer, and a laser printer.

Hardware Configuration

Figure 2:
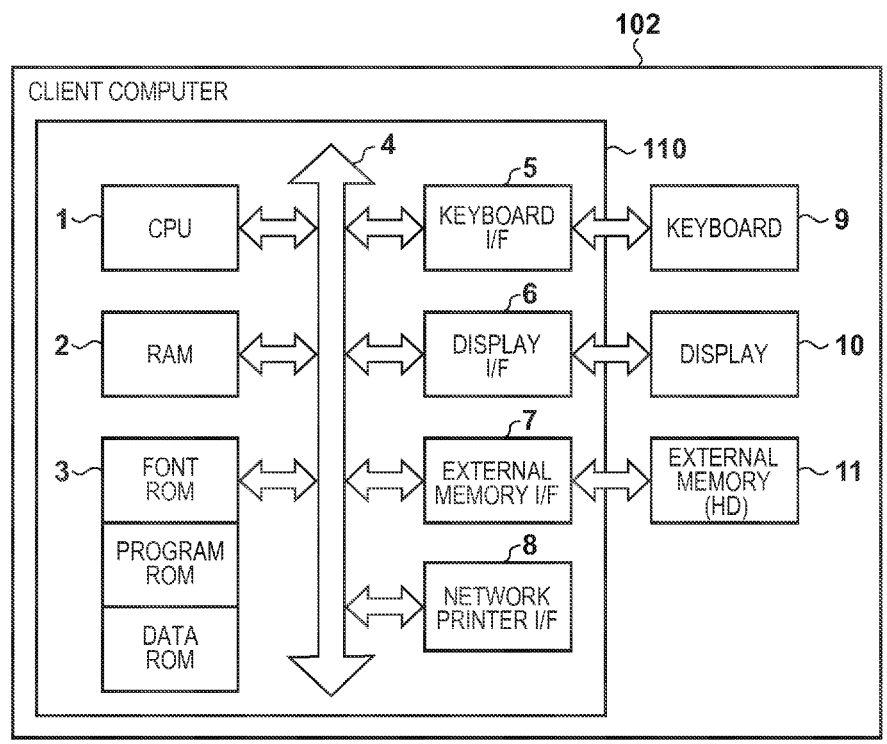
FIG. 2 is a block diagram showing a configuration of a client computer 102.

FIG. 2 is a block diagram showing a representative configuration of the client computer 102. The client computer 102 is controlled by a CPU 1. The CPU 1 can load a basic input/output system (BIOS control program) stored in a ROM 3, and an operating system, various application programs, and the like, which are stored in an external memory 11, to the RAM 2 and execute them. A keyboard 9 that accepts user input, a display 10 for displaying processing results as images to the user, and the like are connected to an information device. Furthermore, a network printer I/F 8 for performing communication with devices such as a printer or other information devices is provided.

Note that the server computer 104 is also configured as a stand-alone server device that has a hardware configuration similar to that of the client computer 102 shown in FIG. 2, or as a cluster server device. Because of this, the hardware configuration of the server computer 104 will not be described.

Figure 3:
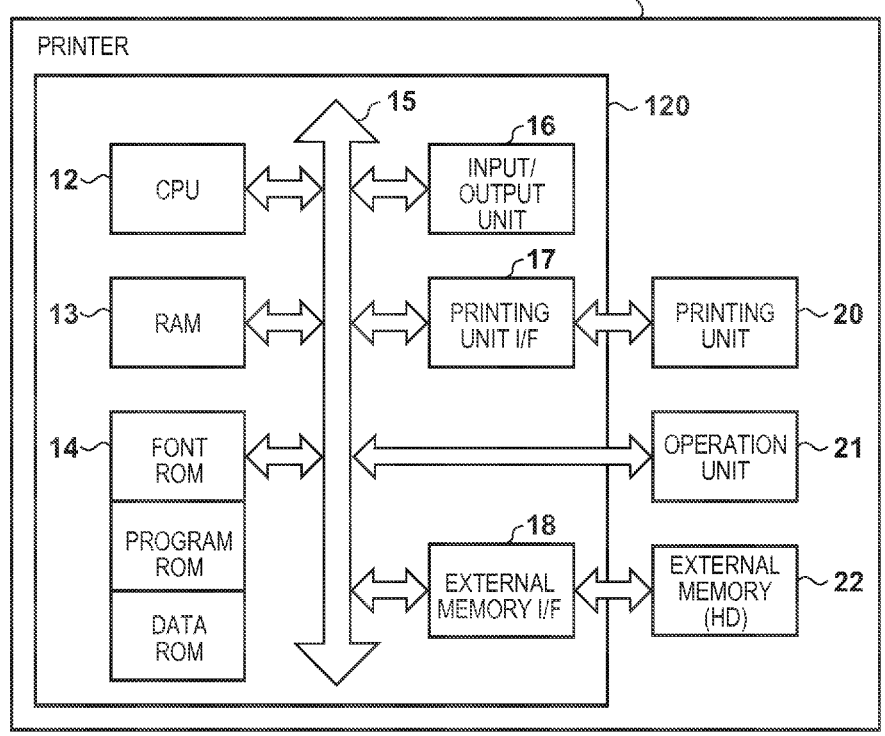
FIG. 3 is a block diagram showing a configuration of a printer 100.

FIG. 3 is a block diagram showing the configuration of the printer 100. The printer 100 is controlled by a CPU 12. The CPU 12 can load a control program stored in a ROM 14, as well as various programs stored in an external memory 22, to a RAM 13 and execute them. Based on the operation of the control program, the CPU 12 performs printing by converting print data and the like input via an input/output unit 16, into image signals and outputting them to a printing unit 20. Also, based on the operation of the control program, the CPU 12 outputs, to the input/output unit 16, the result of processing performed in response to various response requests input via the input/output unit 16. Note that an operation unit 21 is connected to the printer 100, thereby enabling direct input from the user to be received.

A description of an example of realizing plug and play processing will be given below. In plug and play processing executed for a printer, identification information is acquired from the printer via a Universal Serial Bus (USB) or Web Service on Devices (WSD) interface. Using the acquired identification information, the OS searches for the optimal driver, installs the driver, and sets the connection destination at which the printer is detected as an output destination.

With this plug and play processing, printer model identification information (MDL) is acquired from the printer, a printer driver corresponding to the model identification information (MDL) is searched for, the printer driver that was found is installed, and an output destination port is set. If no printer driver corresponding to the model identification information (MDL) is found, the client computer 102 acquires compatible identification information (CID) from the printer. Then, the client computer 102 searches for a printer driver (common driver) that corresponds to acquired compatible identification information (CID), performs installation thereof, and sets an output destination port. Conversely, "compatible identification information" can also be called identification information for a common driver.

By doing this, it is possible for the printer driver that corresponds to the model identification information (MDL) to be installed with priority for each model of printer. If no driver corresponding to the model identification information is found, a common printer driver for multiple types of printers corresponding to the compatible identification information (CID) is installed.

Note that in the present embodiment, a printer driver that corresponds to the model identification information (MDL) and that is provided for each printer model is called a "specific driver". Also, a printer driver that corresponds to compatibility identification information (CID) is called a "class driver". Note that a class driver is used in common by multiple types of printers belonging to an associated printer family or class.

Here, an example of the problem that is presumed in the present embodiment will be explained in detail. If no specific driver that corresponds to the model identification information (MDL) is found, it is also possible to install a class driver that corresponds to compatibility identification information (CID). Using this processing, even in the case where no specific driver is found using plug and play processing, an appropriate class driver can be installed.

However, in order to realize the aforementioned processing, it is necessary for the printer to transmit the compatibility identification information (CID) to the information processing apparatus as a response. However, sometimes the printer does not have the compatibility identification information (CID), and therefore the printer cannot transmit the compatibility identification information to the information processing apparatus. As a result, if no specific driver corresponding to the model identification information (MDL) is found as stated above, the compatibility identification information (CID) is not transmitted from the printer, and therefore there is a possibility that the information processing apparatus will not be able to install an appropriate class driver.

Software Configuration

Figure 4:
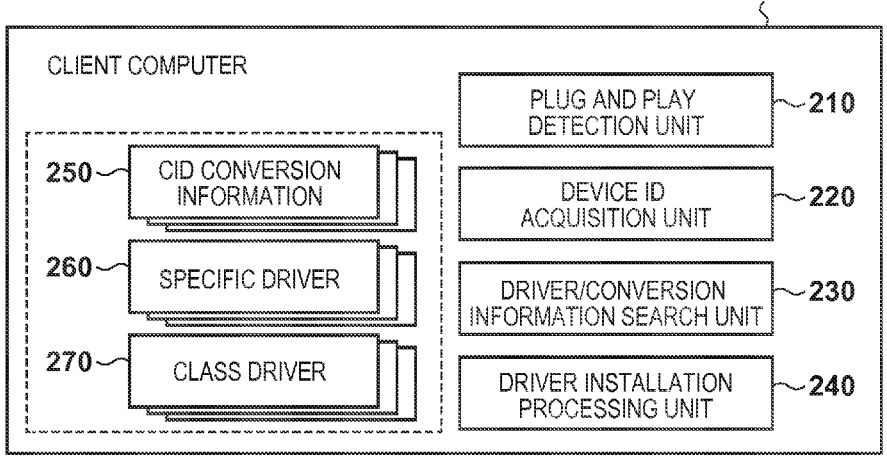
FIG. 4 is a block diagram showing a software configuration of the client computer 102.

FIG. 4 is a block diagram showing a software configuration of the client computer 102. The software configuration of the client computer 102 will be described below with reference to FIG. 4. A plug and play detection unit 210 detects the printer 100, which is connected via an interface such as a Universal Serial Bus (USB) or a Web Service on Devices (WSD) interface. A device ID acquisition unit 220 sends a device ID acquisition request to the printer 100, which was detected with plug and play processing, and acquires a device ID. The device ID will be described later. A driver/conversion information search unit 230 searches for a specific driver 260, a class driver 270, and CID conversion information 250 corresponding to the acquired device ID. Note that the search range of the driver/conversion information search unit 230 is not limited to information inside of the client computer 102, and the search is also performed with respect to a pre-determined server computer 104. A driver installation processing unit 240 performs processing for installing the specific driver 260 or the class driver 270 found by the driver/conversion information search unit 230. Note that the device ID, the specific driver 260, the class driver 270, and the CID conversion information 250 will be described later. Also, the specific driver 260, the class driver 270, and the CID conversion information 250, which are bundled together with the OS and installed at a later time, can be held in the client computer 102. The software shown in FIG. 4 is executed by the CPU of a client PC. In the present embodiment, the plug and play detection unit 210, the device ID acquisition unit 220, the driver/conversion information search unit 230, and the driver installation processing unit 240 in FIG. 4 are described as a portion of the functions of the OS. However, these functions may be provided by software other than the OS.

Figure 5:
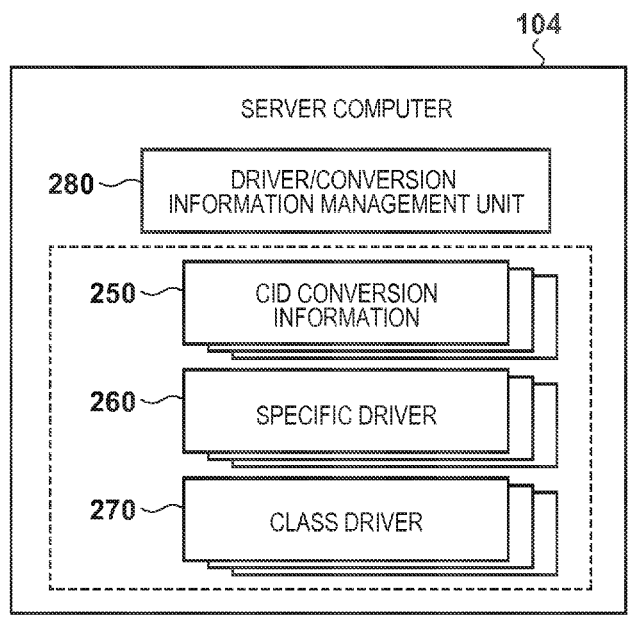
FIG. 5 is a block diagram showing a software configuration of a server computer 104.

FIG. 5 is a block diagram showing a software configuration of the server computer 104. The software configuration of the server computer 104 will be described below with reference to FIG. 5. A driver/conversion information management unit 280 for responding to the driver/conversion information search unit 230 of the client computer 102 is provided in the server computer 104. The server computer 104 provides the client computer 102 with the specific driver 260, the class driver 270, and the CID conversion information 250 via the driver/conversion management unit 280. Note that by holding the latest driver and conversion information provided by printer vendors in the server computer 104, the effect of enabling the provision of the latest driver and conversion information to the client computer 102 is achieved. The software shown in FIG. 5 is executed by the CPU of the server computer 104.

Figure 6:
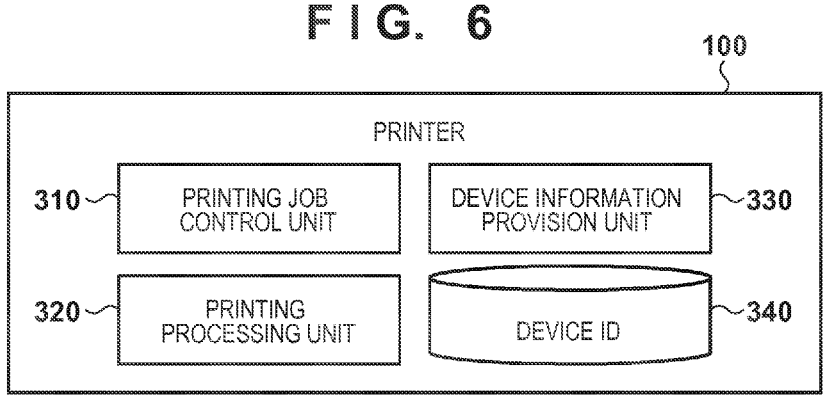
FIG. 6 is a block diagram showing a software configuration of the printer 100.

FIG. 6 is a block diagram showing a software configuration of the printer 100. The software configuration of the printer 100 will be described below with reference to FIG. 6. A print job control unit 310 performs print job control for printing received print data. A print processing unit 320 actually executes print processing. A device information provision unit 330 provides a device ID 340 held in the printer 100 in accordance with a request from the device ID acquisition unit 220 in the client computer 102. The software shown in FIG. 6 is executed by the CPU of the printer 100.

Device ID

FIGS. 7A and 7B are diagrams showing a configuration and an example of the device ID 340. The configuration and the example of the device ID 340 that is handled in the present invention will be described below with reference to FIG. 7A. The device ID 340 is expressed in the form of character string information, and is configured by elements indicated next as main elements. "MANUFACTURER" (MFG below) indicates the manufacturer of the device. "MODEL" (MDL below) indicates the model information of the device. "COMMAND SET" (CMD below) indicates the commands supported by the device. "COMPATIBLE ID" (CID below) indicates compatible information on the family or class that the device belongs to. Note that according to IEEE 1284 standards, it is necessary to provide the MFG, MDL and CMD, but provision of the CID is arbitrary. Also, "model" can be rephrased as "device type", and "model information" can also be called "device type information". The command set is the name of a page description language that the printer can interpret and execute.

FIG. 7B shows an example of a device ID. In this example, it is shown that for this device, the manufacturer is "ABC", "PCL" is supported as the command set, the model name is the printer "M123", and the name "Class1" is given as compatible information.

Specific Driver

The specific driver 260 is a printer driver that corresponds to various models of the printer 100, and it is a printer driver that corresponds to the model information (MDL) in a plug and play system using the device ID 340.

Class Driver

The class driver 270 is a printer driver used in common by the family or class that the printer 100 belongs to, and it is a printer driver that corresponds to the compatible information (CID) in a plug and play system using the device ID 340.

CID Conversion Information

FIGS. 8A and 8B show one example of the CID conversion information 250. The CID conversion information 250 will be explained below with reference to the FIGS. 8A and 8B. FIG. 8A shows an example of information for converting the model information (MDL) of the device ID 340 into pseudo-compatible information 1 (CID'), and FIG. 8B shows an example of information for converting the command set (CMD) into the pseudo-compatible information 2 (CID").

The information for converting the model information (MDL) into the pseudo-compatible information 1 (CID') is CID conversion information 1 (251), and the information for converting the command set (CMD) into the pseudo-compatible information 2 (CID") is CID conversion information 2 (252).

The pseudo-compatible information 1 (CID') for the devices for which the model information (MDL) of the device ID 340 is "M123", "M135", "M147", and "M159", is shown to be "Class 1" in the example of the CID conversion information 1 (251) shown in FIG. 8A. Similarly, it is shown that the pseudo-compatible information 1 (CID') for devices for which the model information (MDL) is "M234", "M246", and "M258" is "Class 2", and the pseudo-compatible information 1 (CID') for devices for which the MDL is "M345" is "Class 3".

By converting the model information (MDL) into the pseudo-compatible information 1 (CID'), a class driver can be installed using the pseudo-compatible information 1 (CID') in place of the compatible information (CID) to a device that does not transmit compatible information (CID) as a response. Also, in the case where a class driver that corresponds to compatible information sent by a device is not found even if that device responds with compatible information (CID), another appropriate class driver can be installed using this pseudo-compatible information 1 (CID').

In the example of the CID conversion information 2 (252) shown in FIG. 8B, it is shown that in the case where the command set (CMD) in the device ID 340 is "PCL", the pseudo-compatible information 2 (CID") is "Class 1". It is shown that in the case where the command set (CMD) is "PCL 6", the pseudo-compatible information 2 (CID") is "Class 2", and in the case of "PS", "Class 3" is employed.

By using the pseudo-compatible information 2 (CID"), even if no compatible information (CID) is sent, or if no class driver that corresponds to the sent compatible information (CID) is found, a class driver can be installed. The command set (CMD) on which the pseudo-compatible information 2 (CID") is based is information on a category that is bigger than the model information (MDL) on which the pseudo-compatible information 1 (CID') is based.

Operations During Plug and Play Processing (Example 1)

Figure 9:
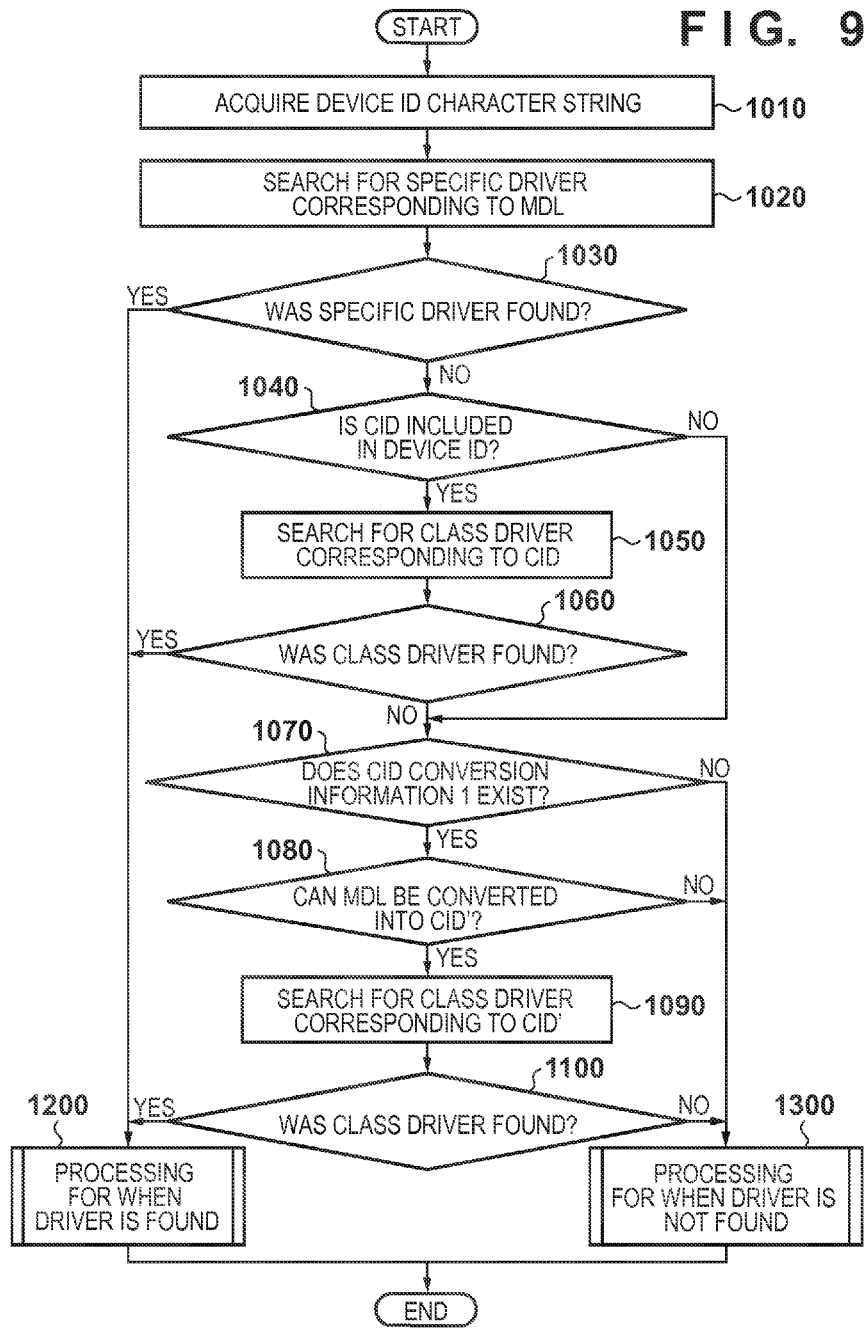
FIG. 9 shows a processing flow of plug and play processing that uses quasi-compatible information 1 (CID').

FIG. 9 shows a processing flow of plug and play processing that uses the pseudo-compatible information 1 (CID'). The plug and play processing that uses the pseudo-compatible information 1 (CID') will be described below with reference to FIG. 9. Note that the flowcharts of this application are realized due to the CPU 1 reading out a program associated with the flowcharts from the memory and executing the program. First, the plug and play detection unit 210 of the client computer 102 detects that the printer 100 is connected via the connection medium 101 and this plug and play processing is started.

The device ID acquisition unit 220 issues an acquisition request for the device ID 340 to the printer 100, the printer 100 receives this acquisition request, and the device information provision unit 330 of the printer transmits the device ID 340 to the acquisition unit 220 as a response. The device ID acquisition unit 220 sends the model information (MDL) included in the acquired device ID 340 to the driver/conversion information search unit 230 (step S1010).

The driver/conversion information search unit 230 carries out a search for the specific driver 260 that corresponds to the model information (MDL) received from the device ID acquisition unit 220 (step S1020).

In step S1030, if the specific driver 260 is found with this search processing in step S1020, processing moves to step S1200, and if it is not found, processing moves to step S1040. The processing in step S1200 will be described later with reference to FIG. 10.

If no specific driver 260 that corresponds to the model information (MDL) is found in step S1020, the device ID acquisition unit 220 checks whether or not the compatible information (CID) was included in the device ID 340 (step S1040).

If the compatible information (CID) is included in the device ID 340, the device ID acquisition unit 220 sends the compatible information (CID) to the driver/conversion information search unit 230 and processing moves to step S1050. If the compatible information (CID) is not included in the device ID 340, processing moves to step S1070. The processing in step S1070 will be described later.

In step S1050, the driver/conversion information search unit 230 carries out a search for the class driver 270 that corresponds to the compatible information (CID) received from the device ID acquisition unit 220.

In step S1060, if the specific driver 270 is found with this search processing in step S1050, processing moves to step S1200, and if it is not found, processing moves to step S1070.

In step S1070, the driver/conversion information search unit 230 performs a search to check whether or not the CID conversion information 1 (251) for converting the model information (MDL) shown in FIG. 8A into the pseudo-compatible information 1 (CID') exists. If this CID conversion information 1 (251) is found, processing moves to the next step, which is step S1080, and if it is not found, processing moves to step S1300. The processing in step S1300 will be described later with reference to FIG. 11.

In step S1080, the driver/conversion information search unit 230 references the CID conversion information 1 (251) and checks whether or not the pseudo-compatible information 1 (CID') corresponding to the model information (MDL) acquired from the device ID acquisition unit 220 exists. If the pseudo-compatible information 1 (CID') that corresponds to the model information (MDL) exists, processing moves to step S1090, and if the pseudo-compatible information 1 (CID') does not exist, processing moves to step S1300.

In step S1090, the driver/conversion information search unit 230 carries out a search for the class driver 270 that corresponds to the pseudo-compatible information 1 (CID') corresponding to the model information (MDL).

In step S1100, if the class driver 270 is found with this search processing in step S1090, processing moves to step S1200, and if it is not found, processing moves to step S1300. If the class driver 270 is found, processing moves to step S1200, and if it is not found, processing branches to step S1300. Note that in step S1090, it is possible to generate pseudo-compatible information corresponding to the model information by referencing the CID conversion information 1, and to install a class driver that corresponds to the generated pseudo-compatible information.

Figure 10:
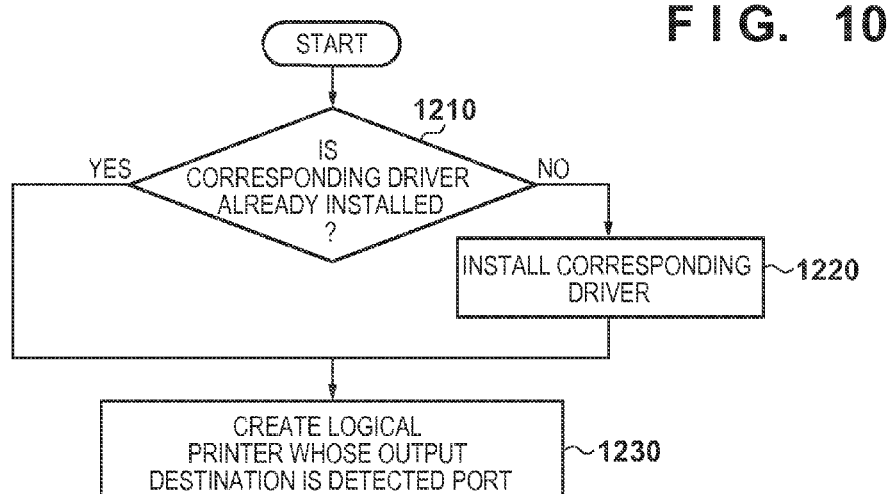
FIG. 10 is a flow of processing (step S1200) for the case where a driver is found.

FIG. 10 shows a flow of processing in the case where the specific driver 260 or the class driver 270 is found in the flow in FIG. 9 (step S1200). The processing in the case where a driver is found will be described below with reference to FIG. 10.

The driver installation processing unit 240 checks whether or not the driver for which installation has been instructed has already been installed in the client computer 102. For example, a list of names of printer drivers installed in the client computer 102 is acquired, and the driver installation processing unit 240 checks whether or not the driver for which installation has been instructed is written in this list. Due to this processing, the driver installation processing unit 240 can determine whether or not that driver has already been installed (step S1210).

If that driver has not yet been installed on the client computer 102, the driver installation unit 240 performs processing for installing that printer driver on the client computer 102 (step S1220).

Even in the case where the driver is already installed in the processing in step S1210, the driver installation unit 240 creates a logical printer whose output destination is the port at which the plug and play detection unit 210 detected the connection of the printer 100 (step S1230).

Here, the logical printer is a logical object for using a printer driver, and it is an object referenced as a "printer" when a printing application performs printing. Note that one logical printer has one print queue.

Figure 11:
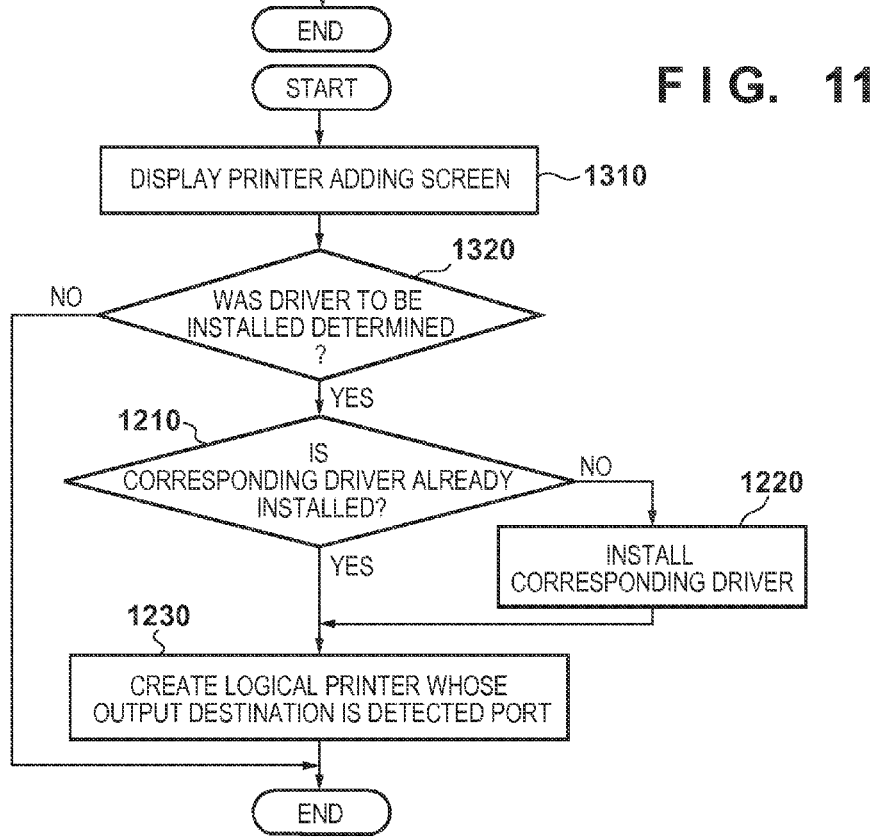
FIG. 11 is a flow of processing (step S1300) for the case where a driver is not found.

FIG. 11 shows a flow of processing in the case where the specific driver 260 or the class driver 270 is not found in the flow of processing in FIG. 9 (step S1300).

The driver installation processing unit 240 displays a dialog for receiving input from a user in order to add a logical printer (step S1310). FIG. 12 is a diagram showing an example of a printer adding screen, and by displaying this kind of dialog, input of a driver to be installed is accepted from the user.

Returning to FIG. 11, the designation of a driver to be installed is received from the user, and the driver installation unit 240 checks whether or not the installation driver has been designated (step S1320). If no driver to be installed has been designated, driver installation and printer adding processing are not performed, and the processing ends. If the user designates a driver to be installed, the same processing as in steps S1210, S1220, and S1230 in FIG. 10 is performed, and processing for installing/adding the driver and the printer is performed.

In a conventional plug and play system, a class driver cannot be installed for a device that does not respond with compatible information (CID), or for a device that responds with compatible information (CID) that is not linked to a class driver. In contrast to this, a plug and play system capable of installing a class driver even in such cases can be provided to the user by using the pseudo-compatible information 1 (CID') as described above.

Embodiment 2

Operations During Plug and Play Processing (Example 2)

Figure 13A:
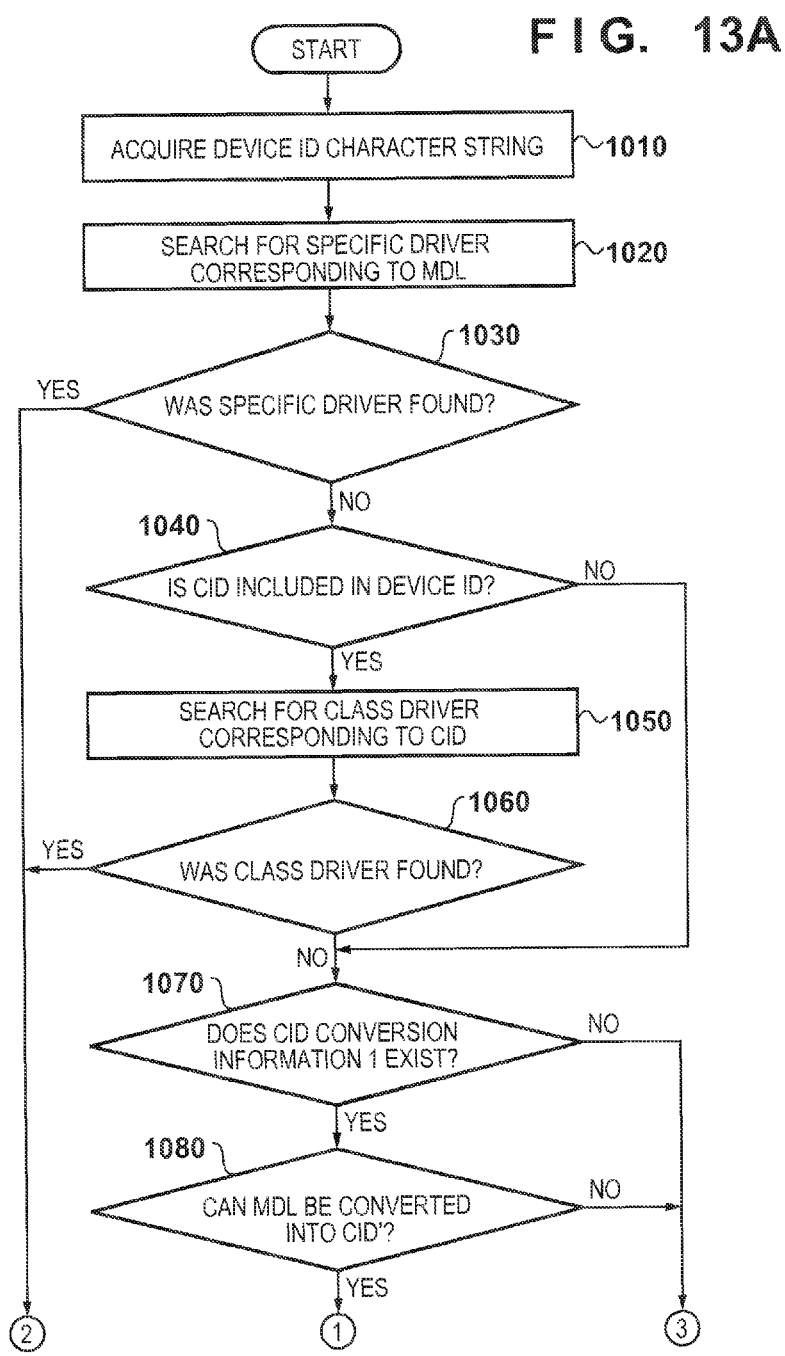
FIGS. 13A and 13B show a processing flow of plug and play processing that uses quasi-compatible information 2 (CID").
Figure 13B:
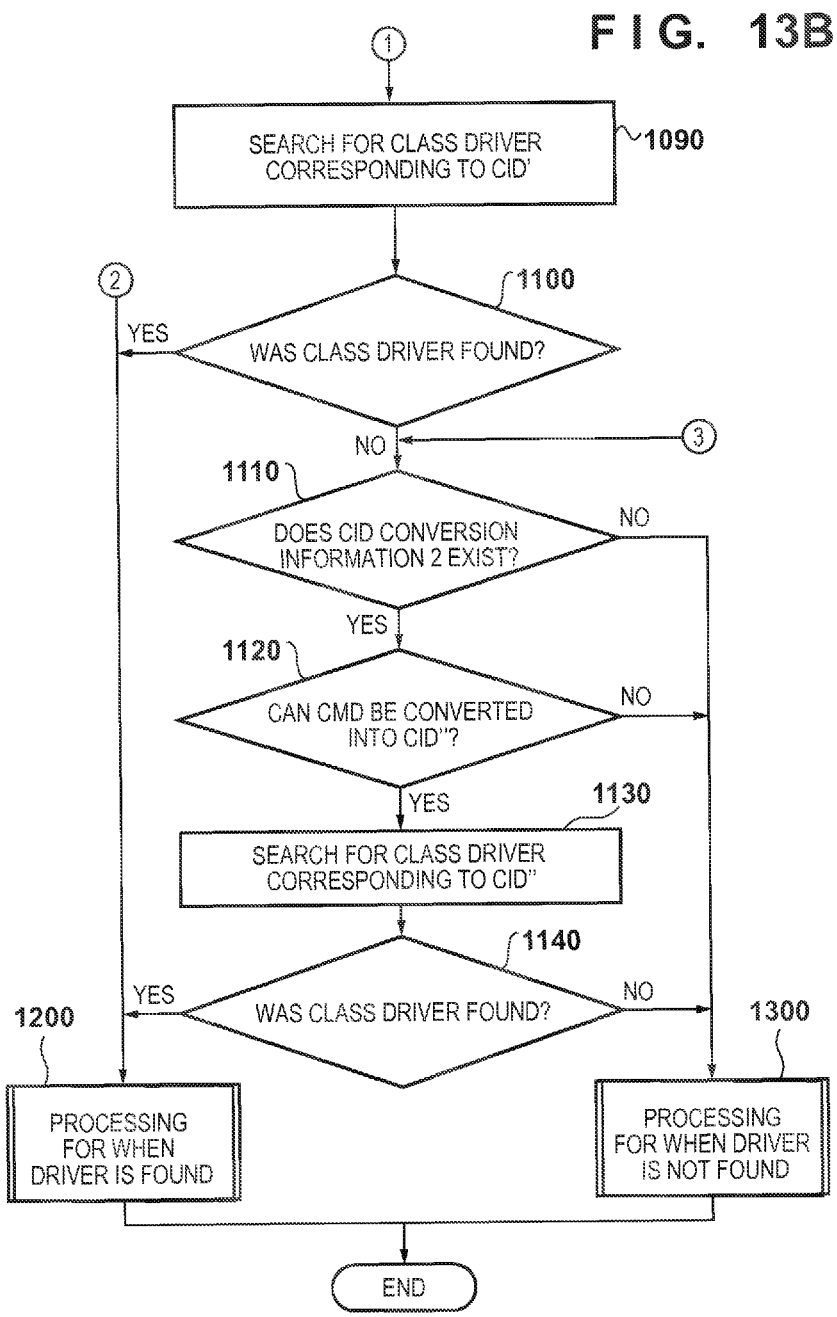

FIGS. 13A and 13B show a processing flow of plug and play processing that uses the pseudo-compatible information 2 (CID"). The plug and play processing that uses the pseudo-compatible information 2 (CID") will be described below with reference to FIGS. 13A and 13B. Note that the flow in FIGS. 13A and 13B is the same as the flow in FIG. 9, with the addition of steps S1110 to S1140. Only the portions that are different from the processing shown in FIG. 9 will be described here. Additionally, other configurations and processes are the same as in Embodiment 1, and therefore a description thereof will be omitted.

If CID compatible information 1 is not found in step S1070 in FIG. 13A, if the pseudo-compatible information 1 (CID') corresponding to model information (MDL) does not exist in step S1080, or if the class driver is not found in step S1100, processing moves to step S1110.

In step S1110, the driver/conversion information search unit 230 performs a search to check whether or not the CID conversion information 2 (252) shown in FIG. 8B for converting the command set (CMD) into the pseudo-compatible information 2 (CID") exists. If that CID information 2 (252) is found, processing moves to the next step, which is step S1120, and if it is not found, processing moves to step S1300.

In step S1120, the driver/conversion information search unit 230 references the CID conversion information 2 (252) and checks whether or not the pseudo-compatible information 2 (CID") that corresponds to the command set (CMD) acquired from the device ID acquisition unit 220 exists. If the pseudo-compatible information 2 (CID") corresponding to the command set (CMD) exists, processing moves to step S1130, and if it does not exist, processing moves to step S1300.

In step S1130, the driver/conversion information search unit 230 carries out a search for the class driver 270 that corresponds to the pseudo-compatible information 2 (CID") corresponding to the command set (CMD).

In step S1140, if the class driver 270 is found with this search processing in step S1130, processing moves to step S1200, and if it is not found, processing moves to step S1300.

FIGS. 13A and 13B show an example in which, in the case where the class driver 270 cannot be found even when using the pseudo-compatible information 1 (CID'), which is based on the model information (MDL), a further search for the class driver 270 is carried out using the pseudo-compatible information 2 (CID"), which is based on the command set (CMD).

This achieves an effect in which, even in the case where the class driver cannot be installed using the pseudo-compatible information 1 (CID'), the class driver can be installed based on the description of the command set (CMD), by using the pseudo-compatible information 2 (CID").

Embodiment 3

Operations During Plug and Play Processing (Example 3)

The following describes an example of a plug and play system extended such that even if a device responds with compatible information (CID) that is already linked to a class driver 270, a different class driver 270 can be installed for that device. In this embodiment, if a system administrator prefers plug and play processing that is different from normal processing such as that described above, a switch is provided for switching between the processing of the two aforementioned examples, and the processing of the present embodiment that can be implemented exclusively from the two aforementioned examples.

Figure 14:
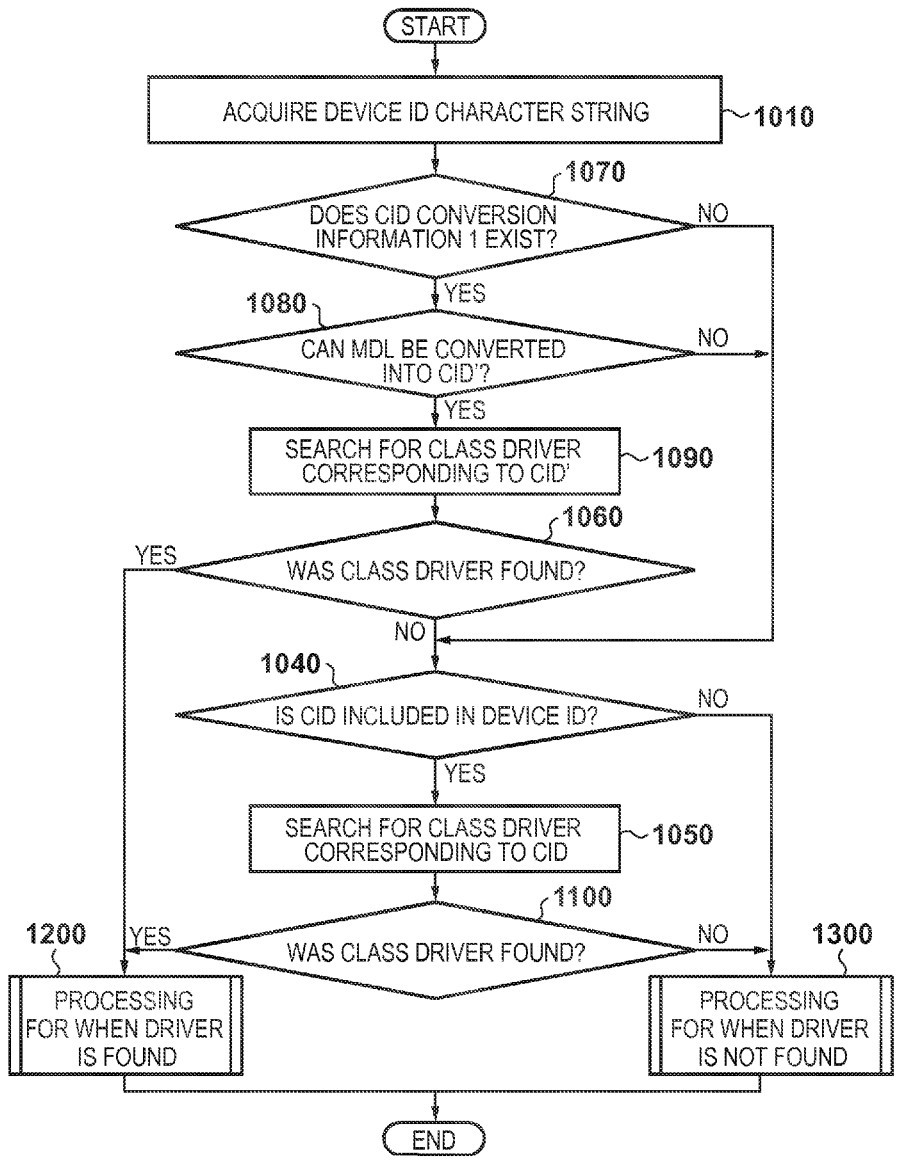
FIG. 14 shows a processing flow of operations (example 3) during plug and play processing.

FIG. 14 shows a processing flow that differs from FIG. 9 in that the search for the specific driver 260 is not included, and in that when the search for the class driver 270 is performed, the pseudo-compatible information 1 (CID') is referenced first, followed by the compatible information (CID), in that order.

The following three points are the differences between FIG. 14 and FIG. 9. Processing for searching for the specific driver (steps S1020, S1030) is not performed. Processing for searching for the class driver 270 using the pseudo-compatible information 1 (CID') (steps S1070 to 1090) is carried out before the processing for searching for the class driver using the compatible information (CID) is carried out. If the class driver 270 is not found in the processing for searching for the class driver 270 using the pseudo-compatible information 1 (CID'), the processing for searching for the class driver 270 using the compatible information (CID) (steps S1040 to S1050) is carried out.

Using the pseudo-compatible information 1 (CID') as described above achieves an effect in which the user is provided with a plug and play system in which even if a device responds with compatible information (CID) that is already linked to a class driver 270, another class driver 270 is installed. For example, the server computer 104 that provides the CID compatible information 1 (251) is arranged in an office intranet. A class driver 270 customized for customer use is described in the CID compatible information 1 (251) in this server computer 104. By constructing a system in such a manner, it is possible to install the special class driver 270 for a specific customer with plug and play processing without changing the printer 100.

Note that similar effects can be achieved with another embodiment, which is not illustrated, in which the pseudo-compatible information 2 (CID") is referenced before the compatible information (CID) is referenced in order to search for the class driver 270.

Embodiment 4

Operations During Plug and Play Processing (Example 4)

Figure 15A:
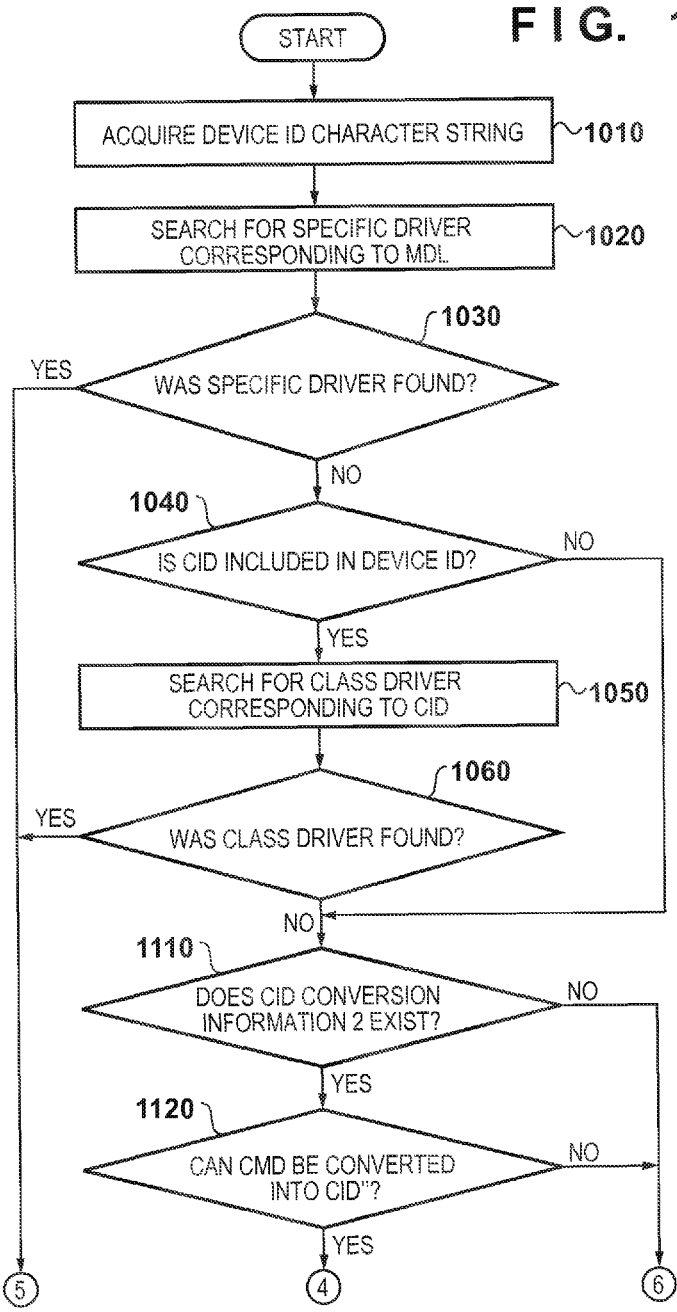
FIGS. 15A and 15B show a processing flow of operations (example 4) during plug and play processing.
Figure 15B:
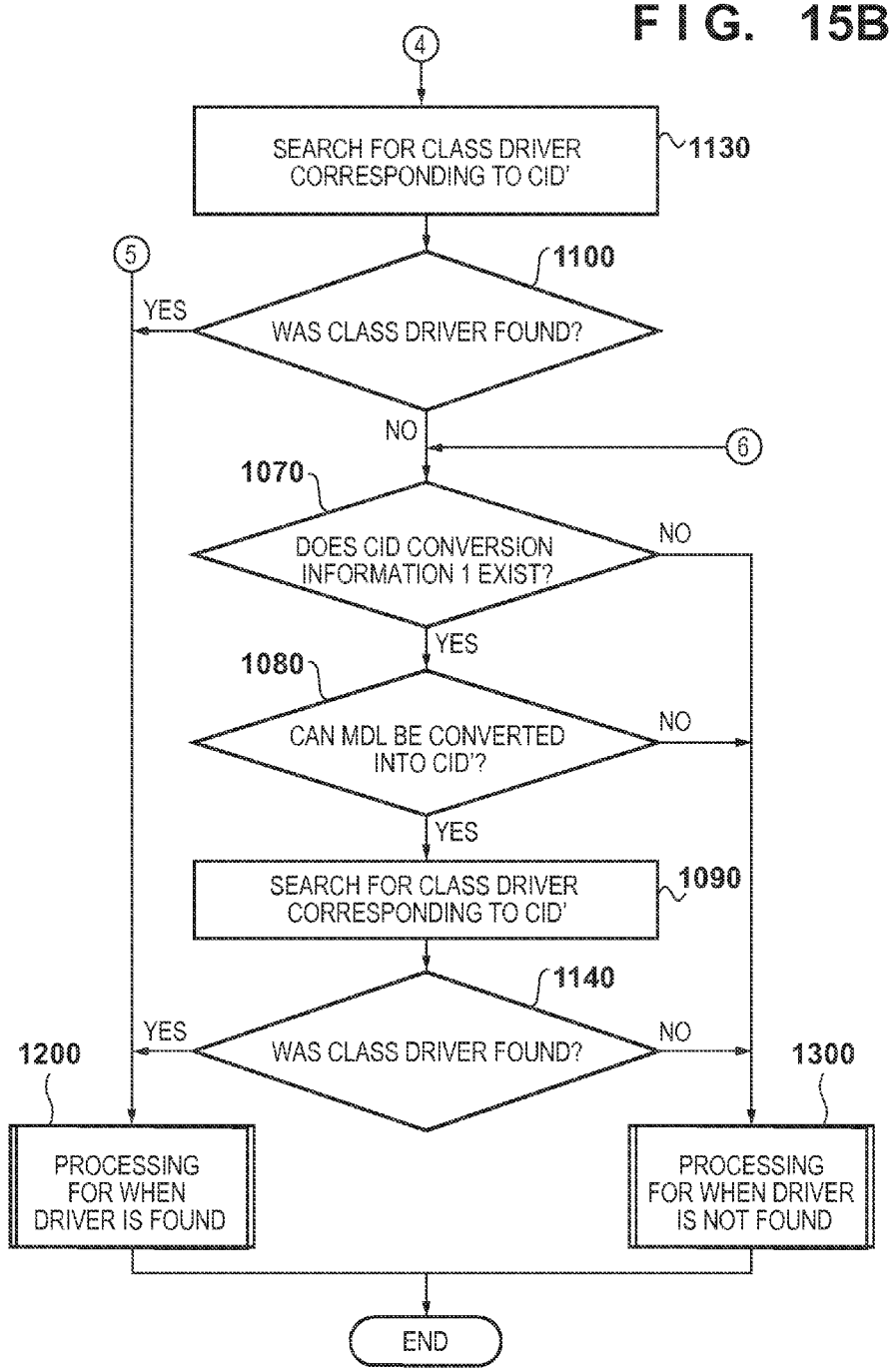

FIGS. 15A and 15B show a processing flow that differs from the example shown in FIGS. 13A and 13B in that when the search for the class driver 270 is performed, the compatible information (CID) is referenced first, followed by the pseudo-compatible information 2 (CID"), and the pseudo-compatible information 1 (CID'), in that order. In this embodiment, if a system administrator prefers plug and play processing that is different from normal processing such as that described above, a switch is provided for switching between the processing of the three aforementioned examples, and the processing of the present embodiment that can be implemented exclusively from the aforementioned third embodiment.

This embodiment differs from the example in FIGS. 13A and 13B in the following two respects. If no class driver 270 is found using the compatible information (CID), processing for searching for the class driver 270 using the pseudo-compatible information 2 (CID") is carried out before the processing for searching for a class driver using the pseudo-compatible information 1 (CID') is carried out. If the class driver is not found by the processing for searching for the class driver 270 using the pseudo-compatible information 2 (CID"), the processing for searching for the class driver 270 using the compatible information 1 (CID') (steps S1070 to S1090) is carried out.

By implementing Embodiment 4, the user is provided with a plug and play system in which the class driver 270 that is linked to the command set (CMD) is installed with priority over the class driver 270 that is linked to the model information (MDL) of the target printer.

Generally, there are fewer types of class drivers 270 that are based on command sets (CMD) than there are types of class drivers 270 that are based on model information (MDL). In other words, by implementing the present invention with this embodiment, it is possible to suppress the number of types of class drivers 270 to be installed.

In the case where an increase in the support cost of an IT administrator is anticipated due to an increase in the number of types of class drivers 270 to be installed when operating the above-described system as shown in FIG. 9 or FIGS. 13A and 13B, the effect of suppressing support cost can be achieved by implementing the invention with the aforementioned embodiment.

Furthermore, the implementing of Embodiments 1 to 4 of the present specification achieves an effect of being able to provide a plug and play system in which a class driver that is valid for a printer is installed without adding any special mechanism to the printer.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-199920, filed Sep. 11, 2012, which is hereby incorporated by reference herein in its entirety.

What is claimed is:

1. An information processing apparatus comprising:
   a determination unit configured to, in a case where a printer driver corresponding to a first identification information included in device information obtained from a printer is not found, determine whether or not a second identification information is included in the device information;
   a generation unit configured to, in a case where it is determined by the determination unit that the second identification information is not included in the device information, generate third identification information based on the first identification information; and
   an installation unit configured to install a printer driver that corresponds to the generated third identification information,
   wherein the printer driver installed by the installation unit is used in common by a plurality of models of printers.

2. The information processing apparatus according to claim 1, wherein fourth identification information indicating a page description language supported by the printer is received from the printer along with the second identification information, and in a case where the third identification information cannot be generated based on the second identification information, the generator generates the third identification information based on the fourth identification information.

3. The information processing apparatus according claim 1, wherein the second identification information is information indicating a printer model, and the third identification information is compatible identification information indicating a common driver for printers.

4. A method of installing a printer driver, comprising:

determining, in a case where a printer driver corresponding to a first identification information included in device information obtained from a printer is not found, whether or not a second identification information is included in the device information;

generating, in a case where it is determined that the second identification information is not included in the device information, third identification information based on the first identification information; and installing a printer driver that corresponds to the generated third identification information, wherein the printer driver installed in the installation step is used in common by a plurality of models of printers.

5. The method according to claim 4, wherein fourth identification information indicating a page description language supported by the printer is received from the printer along with the second identification information, and in a case where the third identification information cannot be generated based on the second identification information, the third identification information is generated based on the fourth identification information.

6. The method according claim 4, wherein the second identification information is information indicating a printer model, and the third identification information is compatible identification information indicating a common driver for printers.

* * * * *